US010268295B2

(12) United States Patent
Yang et al.

(10) Patent No.: US 10,268,295 B2
(45) Date of Patent: Apr. 23, 2019

(54) STRUCTURE FOR PIXELATED SELF-CAPACITANCE (71) Applicant: APPLE INC., Cupertino, CA (US)

(72) Inventors: Byung Duk Yang, Cupertino, CA (US); Chun-Yao Huang, San Jose, CA (US); Kyung-Wook Kim, Cupertino, CA (US); Shih-Chang Chang, Cupertino, CA (US); Szuhsien Lee, San Jose, CA (US); Yong Kwan Kim, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/304,494

(22) PCT Filed: Oct. 1, 2014

(86) PCT No.: PCT/US2014/058701
§ 371 (c)(1),
(2) Date: Oct. 14, 2016

(87) PCT Pub. No.: WO2015/160377
PCT Pub. Date: Oct. 22, 2015

(65) Prior Publication Data
US 2017/0038876 A1    Feb. 9, 2017

Related U.S. Application Data (60) Provisional application No. 61/980,523, filed on Apr. 16, 2014.

(51) Int. Cl.
G06F 3/044    (2006.01)
G06F 3/041    (2006.01)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ................ G06F 3/0412; G06F 3/0416; G06F 2203/04104; G06F 2203/04103
(Continued)

(56) References Cited

U.S. PATENT DOCUMENTS 4,542,960 A    9/1985  Yang
4,916,308 A    4/1990  Meadows
(Continued)

FOREIGN PATENT DOCUMENTS

CN    102193253 A    9/2011
CN    103488332 A    1/2014
(Continued)

OTHER PUBLICATIONS

Final Office Action dated Jul. 14, 2011, for U.S. Appl. No. 12/340,567, filed Dec. 19, 2008, eight pages.
(Continued)

Primary Examiner — Carolyn R Edwards
(74) Attorney, Agent, or Firm — Morrison and Foerster LLP (57) ABSTRACT A touch screen having layers. The touch screen can include a substrate upon which the layers of the touch screen are disposed, and a touch region including a touch pixel electrode, a first display sub-pixel and a second display sub-pixel. The touch screen can also include a sense connection coupled to touch sensing circuitry. An intermediate connection can be disposed between the touch pixel electrode and the sense connection, and can be coupled to the sense connection at the first display sub-pixel and the touch pixel electrode at the second display sub-pixel. In some examples, the sense connection can be disposed at least partially underneath a structure in the first display sub-pixel, such as a data line. In some examples, the intermediate connection
(Continued)

can be comprised of a same material type as a structure in the first display sub-pixel, such as a gate line material.

24 Claims, 7 Drawing Sheets (52) U.S. Cl.
CPC ............. *G06F 2203/04103* (2013.01); *G06F 2203/04104* (2013.01); *G06F 2203/04108* (2013.01); *G06F 2203/04111* (2013.01)

(58) Field of Classification Search
USPC .................................................. 345/156–184
See application file for complete search history.

(56) References Cited

U.S. PATENT DOCUMENTS

| | | |
|---|---|---|
| 5,105,186 A | 4/1992 | May |
| 5,483,261 A | 1/1996 | Yasutake |
| 5,488,204 A | 1/1996 | Mead et al. |
| 5,550,659 A | 8/1996 | Fujieda et al. |
| 5,680,187 A | 10/1997 | Nagayama et al. |
| 5,825,352 A | 10/1998 | Bisset et al. |
| 5,835,079 A | 11/1998 | Shieh |
| 5,838,308 A | 11/1998 | Knapp et al. |
| 5,844,644 A | 12/1998 | Oh et al. |
| 5,880,411 A | 3/1999 | Gillespie et al. |
| 6,057,903 A | 5/2000 | Colgan et al. |
| 6,177,918 B1 | 1/2001 | Colgan et al. |
| 6,188,391 B1 | 2/2001 | Seely et al. |
| 6,204,897 B1 | 3/2001 | Colgan et al. |
| 6,281,957 B1 | 8/2001 | Oh et al. |
| 6,310,610 B1 | 10/2001 | Beaton et al. |
| 6,323,846 B1 | 11/2001 | Westerman et al. |
| 6,483,498 B1 | 11/2002 | Colgan et al. |
| 6,501,529 B1 | 12/2002 | Kurihara et al. |
| 6,549,260 B1 | 4/2003 | Shibahara |
| 6,556,265 B1 | 4/2003 | Murade |
| 6,646,706 B2 | 11/2003 | Lim et al. |
| 6,646,707 B2 | 11/2003 | Noh et al. |
| 6,680,448 B2 | 1/2004 | Kawashima et al. |
| 6,690,387 B2 | 2/2004 | Zimmerman et al. |
| 6,762,815 B2 | 7/2004 | Lee |
| 6,975,379 B2 | 12/2005 | Kim et al. |
| 7,015,894 B2 | 3/2006 | Morohoshi |
| 7,042,444 B2 | 5/2006 | Cok |
| 7,133,032 B2 | 11/2006 | Cok |
| 7,184,064 B2 | 2/2007 | Zimmerman et al. |
| 7,202,856 B2 | 4/2007 | Cok |
| 7,230,608 B2 | 6/2007 | Cok |
| 7,280,167 B2 | 10/2007 | Choi et al. |
| 7,379,054 B2 | 5/2008 | Lee |
| 7,633,595 B2 | 12/2009 | Kim et al. |
| 7,663,607 B2 | 2/2010 | Hotelling et al. |
| 7,969,546 B2 | 6/2011 | Wu et al. |
| 8,144,295 B2 | 3/2012 | Chang et al. |
| 8,169,421 B2 | 5/2012 | Wright et al. |
| 8,294,865 B2 | 10/2012 | Chang et al. |
| 8,330,930 B2 | 12/2012 | Matsumori |
| 8,350,826 B2 | 1/2013 | Watanabe |
| 8,479,122 B2 | 7/2013 | Hotelling et al. |
| 8,497,967 B2 | 7/2013 | Chang et al. |
| 8,749,496 B2 | 6/2014 | Chang et al. |
| 8,866,787 B2 | 10/2014 | Chang et al. |
| 9,367,188 B2 | 6/2016 | Lee et al. |
| 2001/0013915 A1 | 8/2001 | Song |
| 2001/0020578 A1 | 9/2001 | Baier |
| 2001/0026347 A1 | 10/2001 | Sawasaki et al. |
| 2002/0084992 A1 | 7/2002 | Agnew |
| 2002/0159016 A1 | 10/2002 | Nishida et al. |
| 2004/0109097 A1 | 6/2004 | Mai |
| 2004/0114082 A1 | 6/2004 | Lee |
| 2004/0120200 A1 | 6/2004 | Gogl et al. |
| 2004/0141096 A1 | 7/2004 | Mai |
| 2004/0189587 A1 | 9/2004 | Jung et al. |
| 2005/0052582 A1 | 3/2005 | Mai |
| 2005/0140892 A1 | 6/2005 | Kim et al. |
| 2005/0231487 A1 | 10/2005 | Ming |
| 2005/0243023 A1 | 11/2005 | Reddy et al. |
| 2005/0243228 A1 | 11/2005 | Lee et al. |
| 2005/0264232 A1* | 12/2005 | Choi .................. H01J 11/12 315/169.4 |
| 2005/0270435 A1 | 12/2005 | Shiau et al. |
| 2006/0007165 A1 | 1/2006 | Yang et al. |
| 2006/0145365 A1 | 7/2006 | Halls et al. |
| 2006/0146033 A1 | 7/2006 | Chen et al. |
| 2006/0146034 A1 | 7/2006 | Chen et al. |
| 2006/0197753 A1 | 9/2006 | Hotelling |
| 2006/0203151 A1 | 9/2006 | Kim |
| 2006/0244736 A1 | 11/2006 | Tseng |
| 2007/0018969 A1 | 1/2007 | Chen et al. |
| 2007/0075977 A1 | 4/2007 | Chen et al. |
| 2007/0097278 A1 | 5/2007 | Rho et al. |
| 2007/0176905 A1 | 8/2007 | Shih et al. |
| 2007/0216657 A1 | 9/2007 | Konicek |
| 2007/0262967 A1 | 11/2007 | Rho |
| 2007/0291009 A1 | 12/2007 | Wright et al. |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0067528 A1 | 3/2008 | Choi et al. |
| 2008/0074401 A1 | 3/2008 | Chung et al. |
| 2008/0129898 A1 | 6/2008 | Moon |
| 2008/0136980 A1 | 6/2008 | Rho et al. |
| 2008/0150901 A1 | 6/2008 | Lowles et al. |
| 2008/0158172 A1 | 7/2008 | Hotelling et al. |
| 2008/0309627 A1 | 12/2008 | Hotelling et al. |
| 2008/0309633 A1 | 12/2008 | Hotelling et al. |
| 2009/0273577 A1 | 11/2009 | Chen et al. |
| 2009/0323007 A1 | 12/2009 | Shim |
| 2010/0001973 A1 | 1/2010 | Hotelling et al. |
| 2010/0123866 A1 | 5/2010 | Chang et al. |
| 2010/0149128 A1 | 6/2010 | No et al. |
| 2010/0165278 A1 | 7/2010 | Matsumori et al. |
| 2010/0277425 A1 | 11/2010 | Choi et al. |
| 2011/0012845 A1 | 1/2011 | Rothkopf et al. |
| 2011/0074705 A1 | 3/2011 | Yousefpor et al. |
| 2011/0222016 A1 | 9/2011 | Kaneko et al. |
| 2011/0248949 A1 | 10/2011 | Chang et al. |
| 2011/0298731 A1 | 12/2011 | Fu et al. |
| 2012/0019473 A1 | 1/2012 | Edwards |
| 2012/0092273 A1 | 4/2012 | Lyon et al. |
| 2012/0154731 A1 | 6/2012 | Chang et al. |
| 2012/0206395 A1 | 8/2012 | Misaki |
| 2012/0206402 A1 | 8/2012 | Park et al. |
| 2013/0045762 A1 | 2/2013 | Chang et al. |
| 2013/0063891 A1 | 3/2013 | Martisauskas |
| 2013/0093721 A1 | 4/2013 | Nakamura et al. |
| 2013/0113734 A1 | 5/2013 | Cho et al. |
| 2013/0113752 A1 | 5/2013 | Chang et al. |
| 2013/0329150 A1 | 12/2013 | Kim |
| 2014/0028618 A1 | 1/2014 | Chang et al. |
| 2014/0139480 A1 | 5/2014 | Seo et al. |
| 2014/0240286 A1 | 8/2014 | Chang et al. |
| 2016/0004346 A1 | 1/2016 | Zhao |
| 2016/0282997 A1 | 9/2016 | Lee et al. |
| 2017/0199618 A1 | 7/2017 | Roudbari |

FOREIGN PATENT DOCUMENTS

| | | | |
|---|---|---|---|
| CN | 203422722 U | 2/2014 | |
| CN | 203480484 U | 3/2014 | |
| EP | 1 133 057 A2 | 9/2001 | |
| EP | 1 133 057 A3 | 9/2001 | |
| EP | 1 133 057 B1 | 9/2001 | |
| EP | 1 422 601 A1 | 5/2004 | |
| EP | 1 455 264 A2 | 9/2004 | |
| EP | 1 455 264 A3 | 9/2004 | |
| EP | 1 939 673 A1 | 7/2008 | |
| GB | 2 456 221 A | 7/2009 | |
| GB | 2456221 A * | 7/2009 | ......... G02F 1/13338 |
| GB | 2 475 054 A | 5/2011 | |
| JP | 07-036017 A | 2/1995 | |

(56) References Cited

FOREIGN PATENT DOCUMENTS

| JP | 2000-163031 A | 6/2000 |
|---|---|---|
| JP | 2002-342033 A | 11/2002 |
| JP | 2010-152188 A | 7/2010 |
| KR | 10-2001-0083106 A | 8/2001 |
| KR | 10-2005-0070367 A | 7/2005 |
| KR | 10-2008-0091909 | 10/2008 |
| WO | WO-85/03374 A1 | 8/1985 |
| WO | WO-2004/046905 A2 | 6/2004 |
| WO | WO-2004/046905 A3 | 6/2004 |
| WO | WO-2005/036510 A1 | 4/2005 |
| WO | WO-2007/146785 A2 | 12/2007 |
| WO | WO-2007/146785 A3 | 12/2007 |
| WO | WO-2010/065424 A2 | 6/2010 |
| WO | WO-2010/065424 A3 | 6/2010 |
| WO | WO-2013/184597 A1 | 12/2013 |
| WO | WO-2015/183334 A1 | 12/2015 |

OTHER PUBLICATIONS

Final Office Action dated Aug. 22, 2012, for U.S. Appl. No. 12/315,869, filed Dec. 5, 2008, 13 pages.
Final Office Action dated Nov. 19, 2014, for U.S. Appl. No. 13/605,918, filed Sep. 6, 2012, eight pages.
Final Office Action dated Nov. 24, 2015, for U.S. Appl. No. 13/605,918, filed Sep. 6, 2012, seven pages.
International Search Report dated Nov. 12, 2010, for PCT Application No. PCT/US2009/065978, four pages.
International Search Report dated Sep. 17, 2013, for PCT Application No. PCT/US2013/043938, filed Jun. 3, 2013, five pages.
International Search Report dated Dec. 15, 2014, for PCT Application No. PCT/US14/57032, filed Sep. 23, 2014, two pages.
Kanda, E. et al. (2008). "55.2: Integrated Active Matrix Capacitive Sensors for Touch Panel LTPS-TFT LCDs," *SID 08 Digest*, pp. 834-837.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Lee, S. et al. (Oct. 2, 2002). "Ultra-FFS TFT-LCD with Super Image Quality, Fast Response Time, and Strong Pressure-Resistant Characteristics," *Journal of SID* pp. 117-122.
Non-Final Office Action dated Feb. 14, 2011, for U.S. Appl. No. 12/340,567, filed Dec. 19, 2008, nine pages.
Non-Final Office Action dated May 15, 2012, for U.S. Appl. No. 12/315,869, filed Dec. 5, 2008, 14 pages.
Non-Final Office Action dated Dec. 3, 2012, for U.S. Appl. No. 13/656,580, filed Oct. 19, 2012, seven pages.
Non-Final Office Action dated Oct. 23, 2013, for U.S. Appl. No. 12/315,869, filed Dec. 5, 2008, six pages.
Non-Final Office Action dated May 23, 2014, for U.S. Appl. No. 13/605,918, filed Sep. 6, 2012, seven pages.
Non-Final Office Action dated Jul. 9, 2014, for U.S. Appl. No. 14/268,911, filed May 2, 2014, six pages.
Non-Final Office Action dated May 6, 2015, for U.S. Appl. No. 13/605,918, filed Sep. 6, 2012, eight pages.
Non-Final Office Action dated Aug. 10, 2015, for U.S. Appl. No. 14/286,718, filed May 23, 2014, eleven pages.
Non-Final Office Action dated Oct. 15, 2015, for U.S. Appl. No. 13/605,918, filed Sep. 6, 2012, seven pages.
Notice of Allowance dated Jan. 17, 2012, for U.S. Appl. No. 12/340,567, filed Dec. 19, 2008, 10 pages.
Notice of Allowance dated Aug. 6, 2012, for U.S. Appl. No. 13/405,226, filed Feb. 24, 2012, seven pages.
Notice of Allowance dated Apr. 30, 2013, for U.S. Appl. No. 13/656,580, filed Oct. 19, 2012, nine pages.
Notice of Allowance dated Feb. 7, 2014, for U.S. Appl. No. 12/315,869, filed Dec. 5, 2008, five pages.
Notice of Allowance dated Aug. 13, 2014, for U.S. Appl. No. 14/268,911, filed May 2, 2014, five pages.
Notice of Allowance dated Feb. 12, 2016, for U.S. Appl. No. 14/286,718, filed May 23, 2014, nine pages.
Notice of Allowance dated Mar. 8, 2016, for U.S. Appl. No. 14/286,718, filed May 23, 2014, six pages.
Notice of Allowance dated Mar. 25, 2016, for U.S. Appl. No. 14/286,718, filed May 23, 2014, six pages.
Notice of Allowance dated Mar. 30, 2016, for U.S. Appl. No. 13/605,918, filed Sep. 6, 2012, five pages.
ROC (Taiwan) search report dated Mar. 26, 2015, for TW Patent Application No. 102119986, with English translation, two pages.
Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non-Final Office Action dated Feb. 8, 2018, for U.S. Appl. No. 15/313,942, filed Nov. 23, 2016, 12 pages.
Non-Final Office Action dated Jun. 14, 2018, for U.S. Appl. No. 15/179,763, filed Jun. 10, 2016, seven pages.
Final Office Action dated Sep. 13, 2018, for U.S. Appl. No. 15/313,942, filed Nov. 23, 2016, 13 pages.

\* cited by examiner

STRUCTURE FOR PIXELATED SELF-CAPACITANCE

CROSS-REFERENCE TO RELATED APPLICATIONS

This application is a National Phase application under 35 U.S.C. § 371 of International Application No. PCT/US2014/058701, filed Oct. 1, 2014, which claims the priority benefit of U.S. Application No. 61/980,523, filed Apr. 16, 2014, the contents of which are hereby incorporated by reference in their entireties for all intended purposes.

FIELD OF THE DISCLOSURE

This relates generally to touch sensor panels that are integrated with displays, and more particularly, to integrated touch screens in which a self-capacitance touch sensor is utilized to detect the presence of an object in contact with or in close proximity to a touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). The conductive plates can be electrically connected to sense circuitry for sensing touch events on the touch screen. In some examples, these connections can be made using conductive material routed underneath the display pixel stackup, and brought up to the conductive plates through one or more vias. In order to reduce the effect of these connections on the aperture ratio of the touch screen, in some examples, the connections can be routed behind existing structures in the display pixel stackups.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). The conductive plates can be electrically connected to sense circuitry for sensing touch events on the touch screen. These connections can be made using conductive material routed underneath the display pixel stackup, and brought up to the conductive plates through one or more vias. In order to reduce the effect of these connections on the aperture ratio of the touch screen, the connections can be routed behind existing structures in the display pixel stackups.

Figure 1A:
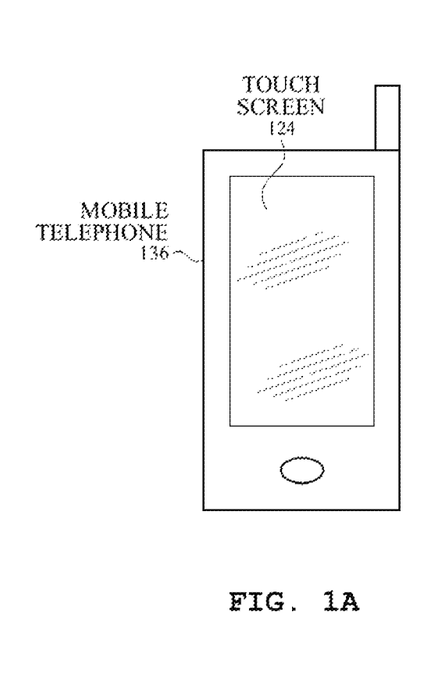
FIGS. 1A-1C illustrate an example mobile telephone, an example media player, and an example portable computing device that each include an exemplary touch screen according to examples of the disclosure.
Figure 1B:
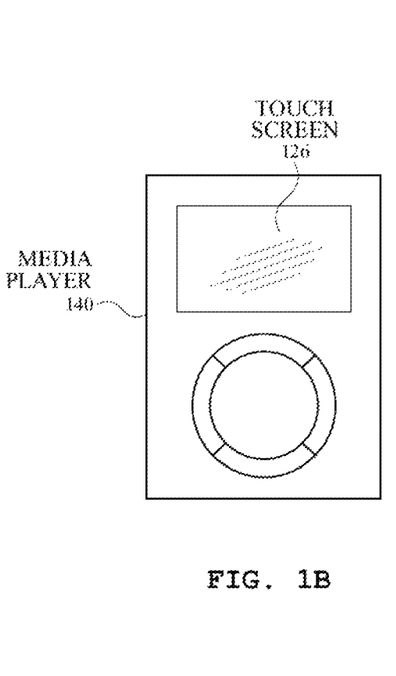
Figure 1C:
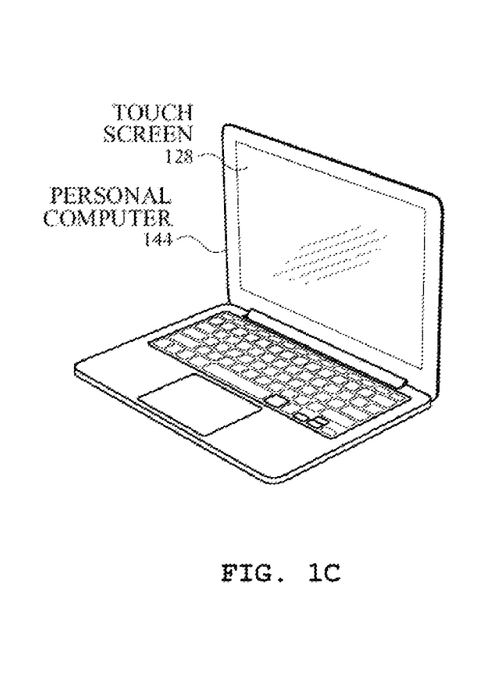

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. Touch screens 124, 126, and 128 can be based on self-capacitance. A self-capacitance based touch system can include a matrix of small, individual plates of conductive material that can be referred to as touch pixel electrodes (as described below with reference to touch screen 220 in FIG. 2). For example, a touch screen can include a plurality of individual touch pixel electrodes, each touch pixel electrode identifying or representing a unique location on the touch screen at which touch or proximity (i.e., a touch or proximity event) is to be sensed, and each touch pixel electrode being electrically isolated from the other touch pixel electrodes in the touch screen/panel. Such a touch screen can be referred to as a pixelated self-capacitance touch screen. During operation, a touch pixel electrode can be stimulated with an AC waveform, and the self-capacitance to ground of the touch pixel electrode can be measured. As an object approaches the touch pixel electrode, the self-capacitance to ground of the touch pixel electrode can change. This change in the self-capacitance of the touch pixel electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

Figure 2:
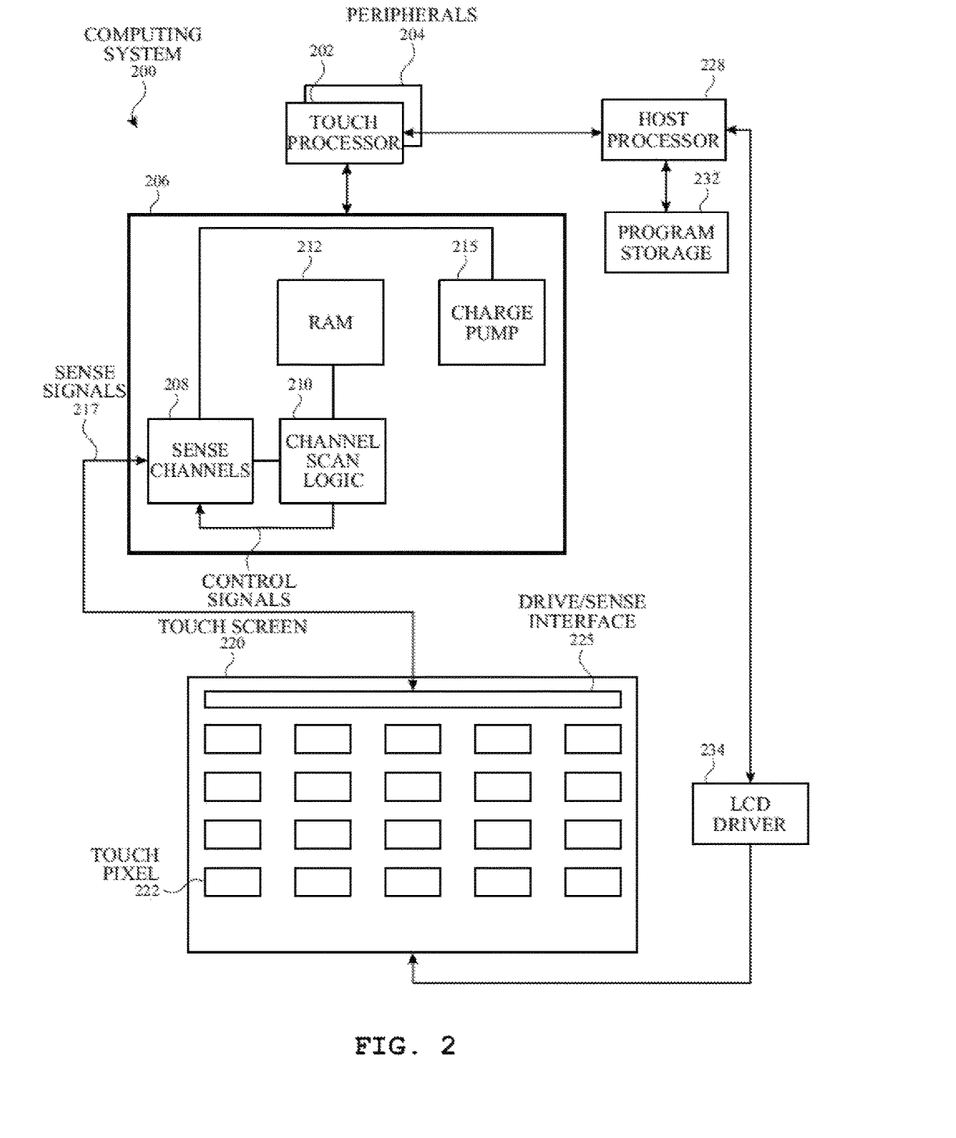
FIG. 2 is a block diagram of an exemplary computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch pixel electrodes 222 (e.g., a pixelated self-capacitance touch screen). Touch pixel electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixel electrodes 222) as "touch pixel" electrodes can be particularly useful when touch screen 220 is viewed as capturing an "image" of touch. In other words, after touch controller 206 has determined an amount of touch detected at each touch pixel electrode 222 in touch screen 220, the pattern of touch pixel electrodes in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described above, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
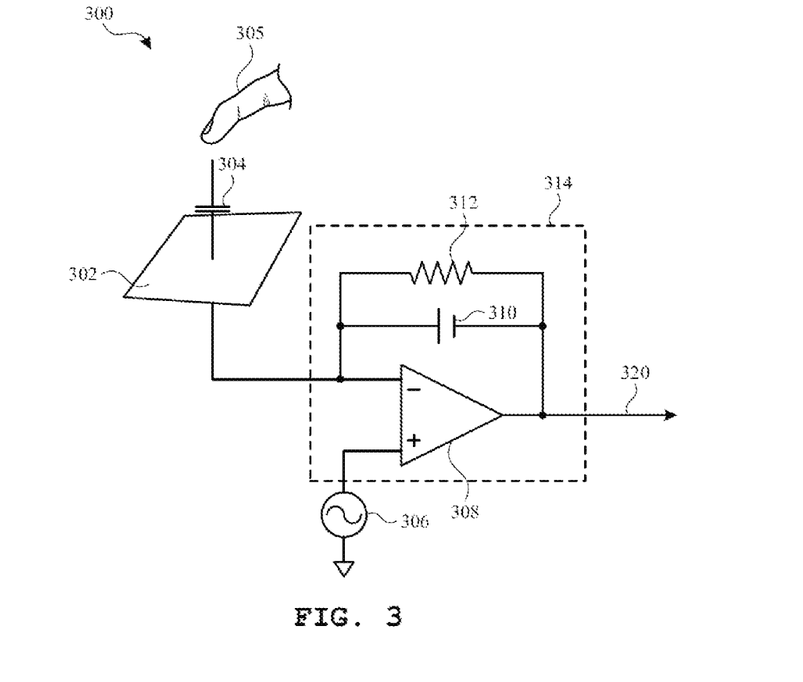
FIG. 3 illustrates an exemplary touch sensor circuit corresponding to a self-capacitance touch pixel electrode and sensing circuit according to examples of the disclosure.

FIG. 3 illustrates an exemplary touch sensor circuit 300 corresponding to a self-capacitance touch pixel electrode 302 and sensing circuit 314 according to examples of the disclosure. Touch pixel electrode 302 can correspond to touch pixel electrode 222. Touch pixel electrode 302 can have an inherent self-capacitance to ground associated with it, and also an additional self-capacitance to ground that is formed when an object, such as finger 305, is in proximity to or touching the electrode. The total self-capacitance to ground of touch pixel electrode 302 can be illustrated as capacitance 304. Touch pixel electrode 302 can be coupled to sensing circuit 314. Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch pixel electrode 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch pixel electrode 302 induced by a finger or object either touching or in proximity to the touch sensor panel. Output 320 can be used by a processor to determine the presence of a proximity or touch event, or the output can be inputted into a discrete logic network to determine the presence of a touch or proximity event.

Figure 4:
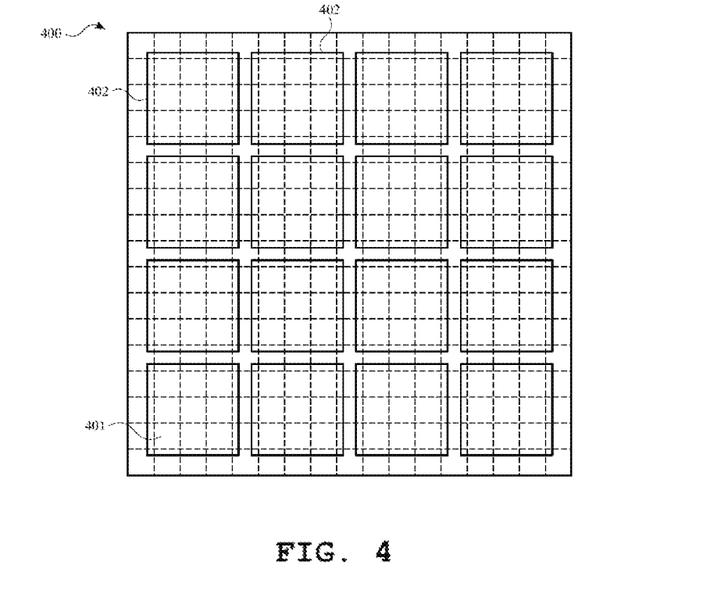
FIG. 4 illustrates an example configuration in which common electrodes can form portions of the touch sensing circuitry of a touch sensing system.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes 402 can form portions of the touch sensing circuitry of a touch sensing system—in some examples of this disclosure, the common electrodes can form touch pixel electrodes used to detect an image of touch on touch screen 400, as described above. Each common electrode 402 (which can define a "touch region" of the touch screen) can include a plurality of display pixels 401, and each display pixel 401 can include a portion of a common electrode 402, which can be a circuit element of the display system circuitry in the pixel stackup (i.e., the stacked material layers forming the display pixels) of the display pixels of some types of LCD or other displays that can operate as part of the display system to display an image.

In the example shown in FIG. 4, each common electrode 402 can serve as a multi-function circuit element that can operate as display circuitry of the display system of touch screen 400 and can also operate as touch sensing circuitry of the touch sensing system. In this example, each common electrode 402 can operate as a common electrode of the display circuitry of the touch screen 400, as described above, and can also operate as touch sensing circuitry of the touch screen. For example, a common electrode 402 can operate as a capacitive part of a touch pixel electrode of the touch sensing circuitry during the touch sensing phase. Other circuit elements of touch screen 400 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel electrode in an "off" state. Stimulation signals can be applied to common electrode 402. Changes in the total self-capacitance of common electrode 402 can be sensed through an operational amplifier, as previously discussed. The change in the total self-capacitance of common electrode 402 can depend on the proximity of a touch object, such as finger 305, to the common electrode. In this way, the measured change in total self-capacitance of common electrode 402 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch pixel electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure.

As described above, the self capacitance of each common electrode 402 (i.e., touch pixel electrode) in touch screen 400 can be sensed to capture an image of touch across touch screen 400. To allow for the sensing of the self capacitance of individual common electrodes 402, it can be necessary to route one or more electrical connections between each of the common electrodes and the touch sensing circuitry (e.g., sense channels 208) of touch screen 400. In some examples, such electrical connections can be formed underneath the structures of touch screen 400, such as display pixels 401 and/or common electrodes 402, so as to avoid increasing the size of the touch screen and/or to reduce the effect of such connections on the electrical and/or optical performance of the touch screen.

Figure 5:
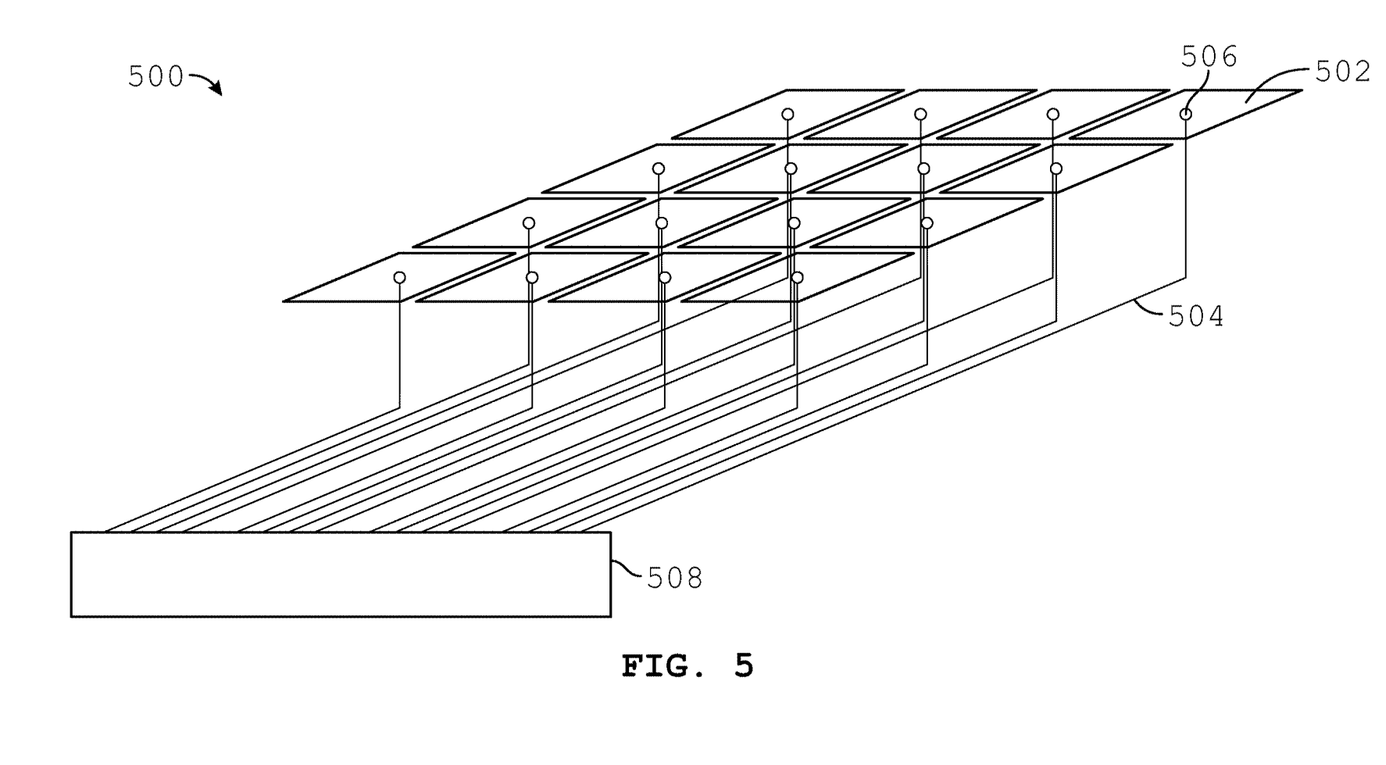
FIG. 5 illustrates an exemplary configuration for electrically connecting touch pixels in a touch screen to sense channels according to examples of the disclosure.

FIG. 5 illustrates an exemplary configuration for electrically connecting touch pixel electrodes in touch screen 500 to sense channels 508 according to examples of the disclosure. Touch screen 500 can include touch pixel electrodes 502, as described above. Components of touch screen 500 other than touch pixel electrodes 502 are not illustrated for simplicity. Each of touch pixel electrodes 502 can be electrically connected to sense channels 508 through sense connections 504 and vias 506. Vias 506 can allow for an electrical connection between touch pixel electrodes 502 and sense connections 504 through one or more intervening layers that may exist between the touch pixel electrodes and the sense connections in touch screen 500. Selective placement of sense connections 504 and vias 506 in relation to other components of touch screen 500 can reduce optical effects the sense connections and vias may have on an image displayed on the touch screen, as will be described further below. Further, in some examples, sense connections 504 can be made to be relatively "deep" (i.e., far from touch pixel electrodes 502 and display pixel components) in the stackup of touch screen 500 so as to reduce parasitic effects that the sense connections might have on the operation of the touch pixel electrodes and/or any other components of the touch screen.

Figure 6:
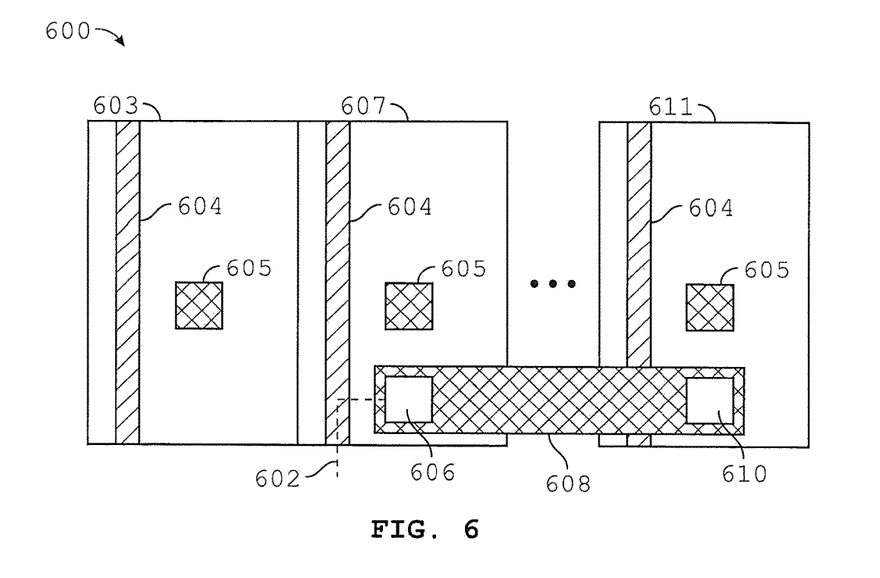
FIG. 6 illustrates an exemplary top view of a collection of display sub-pixels contained within a touch pixel of the touch screen of this disclosure.

FIG. 6 illustrates an exemplary top view 600 of a collection of display sub-pixels contained within a touch pixel of the touch screen of this disclosure. For example, display sub-pixels 603, 607 and 611 can each be any one of a red display sub-pixel, a green display sub-pixel and a blue display sub-pixel in an RGB touch screen, and the display sub-pixels can be within a single "touch region" (i.e., the region of the touch screen that is defined by a touch pixel). A display pixel can be made up of a plurality of display sub-pixels, e.g., a red display sub-pixel, a green display sub-pixel and a blue display sub-pixel. Each display sub-pixel can have substantially the same components as other display sub-pixels, such as components needed for the operation of the display sub-pixel (e.g., controlling the luminance of the display sub-pixel). For example, display sub-pixel 603 can include a data line portion 604 and a gate line portion 605. It is understood that display sub-pixel 603 can include other components as well, such as one or more thin film transistors (TFTs) and related components, though such components are omitted from this discussion for simplicity. Data line portion 604 can be a conductive material, such as an Indium Tin Oxide (ITO), for supplying data signals to a pixel transistor in display sub-pixel 603 to control the pixel luminance, as described above. Gate line portion 605 can be a conductive material for supplying gate signals to a gate of the pixel transistor in display sub-pixel 603 to control the current flow through the pixel transistor. Display sub-pixels 607 and 611 can have structures similar to that of display sub-pixel 603.

Components such as data line portion 604, gate line portion 605 and TFTs in display sub-pixels 603, 607 and 611 can partially block light that may be emitted from the areas of the respective display sub-pixels, which can affect the aperture ratio (i.e., ratio of light-emitting area to non-light-emitting area) of the touch screen of this disclosure. Adding sense connections 504 underneath display sub-pixels 603, 607 and 611 to further consume the areas of display sub-pixels 603, 607 and 611 can additionally reduce the aperture ratio of the touch screen, because the sense connections can also partially block light that may be emitted from the areas of the respective display sub-pixels. In order to minimize the effect of sense connections 504 on the aperture ratio of the touch screen, the sense connections can be routed underneath existing light-blocking structures, such as data lines 604, that may exist in display sub-pixels 603, 607 and 611.

Sense connection 602 in FIG. 6 can correspond to one of sense connections 504 illustrated in FIG. 5. In other words, sense connection 602 can facilitate an electrical connection between a touch pixel electrode—which can define a "touch region" within which display sub-pixels 603, 607 and 611 are included—and sense channels 508. Sense connection 602 can be routed underneath the various structures of display sub-pixel 607 and any other display sub-pixels through which the sense connection passes, as discussed above. In this example, sense connection 602 can be routed underneath data line portion 604, though the sense connection could additionally or alternatively be routed underneath other light-blocking structures, as discussed above. Though not illustrated, data line portion 604 can extend through additional display sub-pixels that can be disposed above and/or below display sub-pixel 607, and sense connection 602 can be routed underneath the data line portion through one or more of those additional display sub-pixels as well. In this way, the effect of sense connection 602 on the aperture ratio of the touch screen of the disclosure can be minimized. Sense connection 602 is illustrated as a dashed line for simplicity; however, it is understood that the sense connection can have a non-zero volume, and thus a non-zero height and width.

Because sense connection 602 can be routed underneath various components of the display sub-pixels and the touch pixel electrodes 502 of the touch screen of this disclosure, a via can be used to electrically connect the sense connection to a touch pixel electrode (not illustrated in FIG. 6). Such a via, like other components that may exist within the areas of display sub-pixels, can also partially block light output of the display sub-pixels, and can thus affect the aperture ratio of the touch screen of this disclosure. Further, if such a via is required to connect a touch pixel electrode 502 to a sense connection 602 through a relatively thick collection of one or more layers of material, the via may need to be relatively large in order to effectively make the electrical connection (otherwise, the aspect ratio of the via may be too high to effectively make the electrical connection). A large via can further detrimentally affect the aspect ratio of the touch screen of the disclosure.

Instead of one large via, in some examples, two or more smaller vias can be used to connect touch pixel electrode 502 to sense connection 602. An example using two vias will be described herein for simplicity, though it is understood that the scope of the disclosure similarly extends to three or more vias as well. One of the two vias can be used to connect sense connection 602 to an intermediate conductive material (i.e., intermediate connection) that can be in between touch pixel electrode 502 and the sense connection, and the other of the two vias can be used to connect the intermediate conductive material to the touch pixel electrode. For example, as illustrated in FIG. 6, via 606 can be used to connect sense connection 602 to intermediate conductive material 608, which can be disposed between touch pixel electrode 502 (not illustrated in FIG. 6) and the sense connection 602. Via 610 can be used to connect intermediate conductive material 608 to touch pixel electrode 502. Each of vias 606 and 610 can be smaller than a single via that may otherwise be used to directly connect sense connection 602 to touch pixel electrode 502, because each of the vias can propagate through a thinner collection of one or more layers of material than a single via would otherwise need to. Thus, vias 606 and 610 can be less detrimental to the aspect ratio of the touch screen of this disclosure as compared to a single large via. Vias 606 and 610 can be the same size (e.g., width and depth) as each other, though they need not be.

In some examples, intermediate conductive material 608 can be formed of the same material and in the same layer as another structure that may exist in each of display sub-pixels 603, 607 and 611; for example, the intermediate conductive material can be formed of the same material and in the same layer as gate line portion 605. In this way, intermediate conductive material 608 can be formed on the touch screen without having to add additional processing steps (such as additional deposition or etching steps) to the fabrication of the touch screen. Intermediate conductive material 608 can be transparent so as to reduce its effect on the aperture ratio of the touch screen of the disclosure. In some examples, intermediate conductive material 608 can also be formed to follow or shadow other light-blocking structures that may exist in the touch screen, much like sense connection 602. Though intermediate conductive material 608 is illustrated as being on top of data line portion 604 in display sub-pixel 611, it is understood that this need not be the case.

Vias 606 and 610 can be formed anywhere in the touch pixel that contains display sub-pixels 603, 607 and 611, including being formed within the same display sub-pixel. In some examples, one of the vias, such as via 606, can be formed in one display sub-pixel (e.g., display sub-pixel 607), and the other of the vias, such as via 610, can be formed in another display sub-pixel (e.g., display sub-pixel 611). Display sub-pixels 607 and 611 can be adjacent display sub-pixels, or they can be separated by other display sub-pixels, as illustrated. In some examples, one or both of vias 606 and 610 can be formed to follow or shadow other light-blocking structures that may exist in the touch screen, much like sense connection 602. In some examples, vias 606 and 610 can be formed in blue display sub-pixels in an RGB touch screen, as blue display sub-pixels can contribute less to the luminance of an RGB display pixel (R display sub-pixel, G display sub-pixel, B display sub-pixel) than red or green display sub-pixels—thus, any effect that the vias may have on light output for the display pixel, and thus the touch screen as a whole, can be minimized. Further, the placement of vias—such as vias 606 and 610—in the various touch pixels of the touch screen can be randomized so as to reduce a viewer's perception of any effect the vias may have on the aperture ratio of the touch screen, as patterned defects in a displayed image may be more perceptible to a viewer than random defects.

Figure 7:
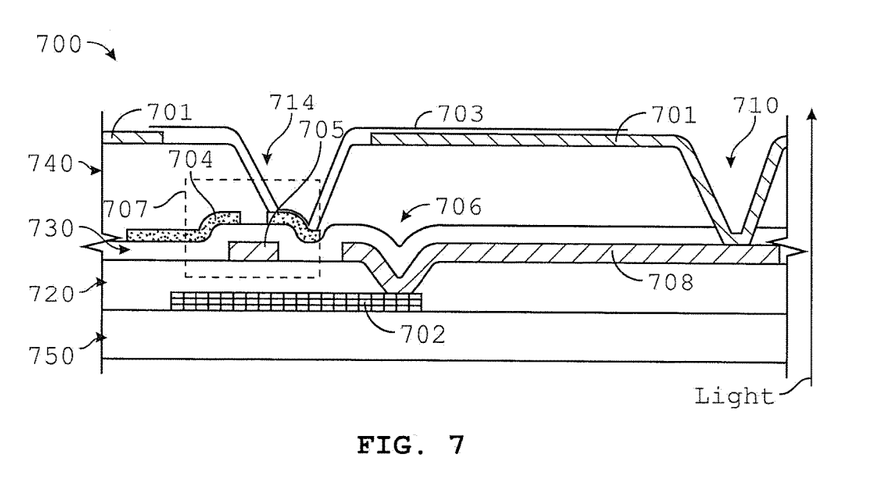
FIG. 7 illustrates an exemplary cross-section of layers of the touch screen of the disclosure, the layers including a sense connection, two vias, and an intermediate conductive material according to examples of the disclosure.

FIG. 7 illustrates an exemplary cross-section 700 of layers of the touch screen of the disclosure, the layers including sense connection 702, vias 706 and 710, and intermediate conductive material 708 according to examples of the disclosure. Cross-section 700 includes components not included in FIG. 6, such as TFT 707, for further illustration of the scope of the disclosure, though it is understood that such components need not be placed as illustrated. As will be described below, the layers of the touch screen can be disposed on substrate 750. In particular, sense connection 702 can be formed on substrate 750. Substrate 750 can be any substrate suitable for use in a touch screen, such as glass. In the example illustrated, most of sense connection 702 can be formed underneath one or more components of TFT 707, such as data line portion 704 and gate line portion 705. Data line portion 704 can be connected to the source/drain of TFT 707, and gate line portion 705 can be connected to the gate of the TFT. Sense connection 702 can be electrically insulated from TFT 707 and its components by material 720. Material 720 can be any insulating material, such as a spin-on-glass (SOG) material.

Via 706 can electrically connect sense connection 702 and intermediate conductive material 708, and in some examples can bring the sense connection up to the same layer as TFT 707 and other related components. As discussed above, intermediate conductive material 708 can be formed of the same material as gate line portion 705, though it need not be. Via 710 can electrically connect intermediate conductive material 708 and touch pixel electrode 701, thus completing the electrical connection between sense connection 702 and the touch pixel electrode. Material 730 can be any insulator for electrically insulating gate line portion 705 from the source/drain of TFT 707 and from data line portion 704. Material 740 can also be any insulator for electrically insulating components such as data line portion 704 from pixel electrode 703 and touch pixel electrode 701. Via 714 can electrically connect pixel electrode 703 to TFT 707 such that the TFT, in conjunction with gate line portion 705 and data line portion 704, can control the luminance of the display pixel in which the TFT is included, as discussed above.

Once sense connection 702 and material 720 have been formed on substrate 750, the process for fabricating the remainder of the touch screen can proceed substantially without regard to the existence of the sense connection and material 720. In other words, sense connection 702 and material 720 can be formed on substrate 750, and thereafter, standard processes can be used to form TFT 707, touch pixel electrode 701 and other touch screen components, with the exception of the formation of vias 706 and 710 and intermediate conductive material 708. For this reason, it can be beneficial for material 720 to be mechanically, chemically, and/or thermally stable so as to minimize any effect the material might have on subsequent processing steps. Further, to reduce potential parasitic effects of sense connection 702 on the operation of other parts of the touch screen, such as TFT 707, in some examples, material 720 can be relatively thick (e.g., on the order of the thickness of material 740 or thicker).

Figure 8A:
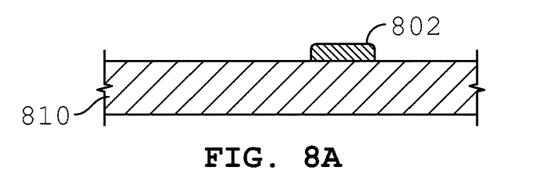
FIGS. 8A-8F illustrate an exemplary process for fabricating the sense connection structure of the examples of the disclosure.

FIGS. 8A-8F illustrate an exemplary process for fabricating the sense connection structure of the examples of the disclosure. FIG. 8A illustrates the first step of the exemplary process. Sense connection 802 can be formed on substrate 810. Sense connection 802 can be formed using any suitable material and method for forming a patterned electrically conductive material on substrate 810. Substrate 810 can be any material that can be used in a touch screen, such as glass.

Figure 8B:
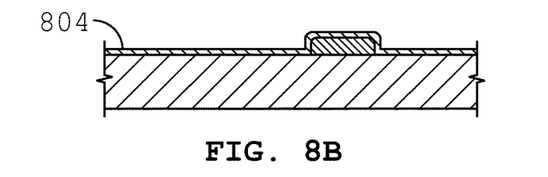

FIG. 8B illustrates the second step of the exemplary process. First capping layer 804 can be formed over substrate 810 and sense connection 802. First capping layer 804 can be optional, but can be useful in protecting sense connection 802 from subsequent process steps, protecting subsequent process steps from the sense connection, and/or maintaining the structural integrity of the sense connection. For example, first capping layer 804 can be useful for containing electromigration of sense connection 802 in an example in which the sense connection is made of copper. First capping layer 804 can be any material that can be used for such a purpose, such as SiN.

Figure 8C:
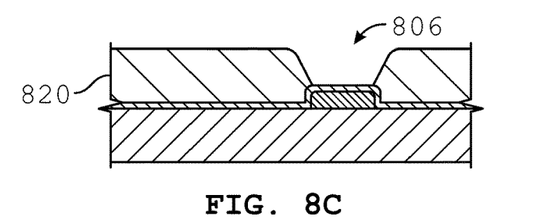

FIG. 8C illustrates the third step of the exemplary process. Material 820 having via 806 can be formed. In this example, material 820 can be a photosensitive material (positive or negative), such as a photosensitive spin-on-glass (SOG) material. Thus, material 820 can be, for example, sprayed or spun over the structures below, exposed to light and processed to form via 806. In some examples, material 820 can be subsequently cured at a specified temperature before proceeding to the next step of the exemplary process.

Figure 8D:
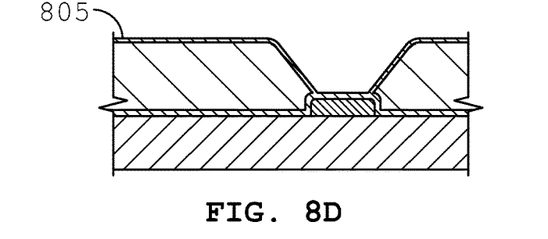

FIG. 8D illustrates the fourth step of the exemplary process. Second capping layer 805 can be formed over the structures below. Second capping layer 805, like first capping layer 804, can be optional, but can be useful in protecting subsequent process steps from material 820, because in some examples, material 820 can be porous and can trap substances that may be expelled during subsequent process steps. Second capping layer 805 can be any material that can be used for such a purpose, such as SiN.

Figure 8E:
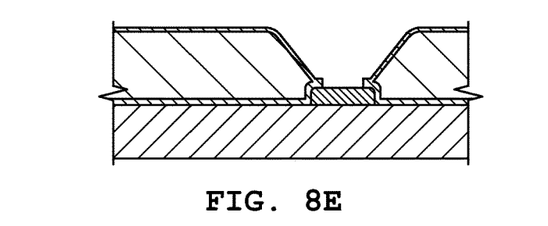

FIG. 8E illustrates the fifth step of the exemplary process. First capping layer 804 and second capping layer 805 inside via 806 can be opened up to allow for electrical contact to be made to sense connection 802. The opening of first capping layer 804 and second capping layer 805 can be accomplished using any suitable process, such as a photolithography step followed by an etch step (e.g., dry etching), for example.

Figure 8F:
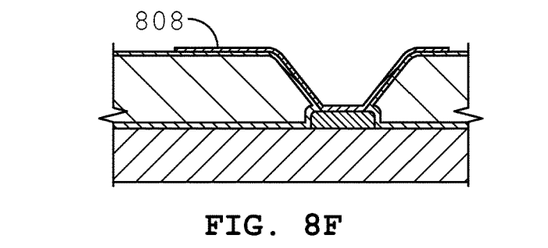

FIG. 8F illustrates the sixth step of the exemplary process. Intermediate conductive material 808 can be formed inside via 806 and over material 720 and second capping layer 805, if used. Intermediate conductive material 808 can be formed using any suitable material and method for forming a patterned electrically conductive material over the structures below.

FIGS. 9A-9F illustrate another exemplary process for fabricating the sense connection structure of the examples of the disclosure. The steps of FIGS. 9A and 9B can be the same as those of FIGS. 8A and 8B.

Figure 9A:
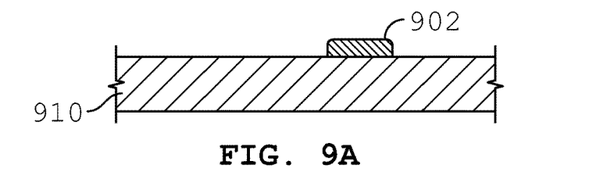
FIGS. 9A-9F illustrate another exemplary process for fabricating the sense connection structure of the examples of the disclosure.
Figure 9B:
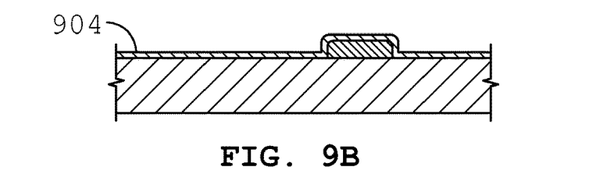
Figure 9C:
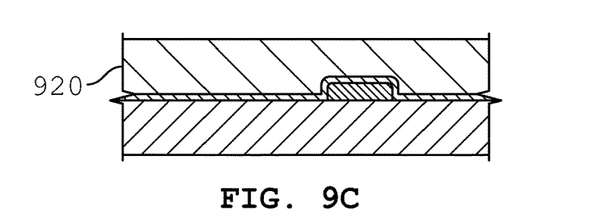

FIG. 9C illustrates the third step of the exemplary process. Material 920 can be formed over the structures below. In this example, material 920 can be a material that is not photosensitive, such as a non-photosensitive spin-on-glass (SOG) material or other planarization material. Material 920 can be, for example, sprayed or spun over the structures below. In some examples, material 920 can be subsequently cured at a specified temperature before proceeding to the next step of the exemplary process.

Figure 9D:
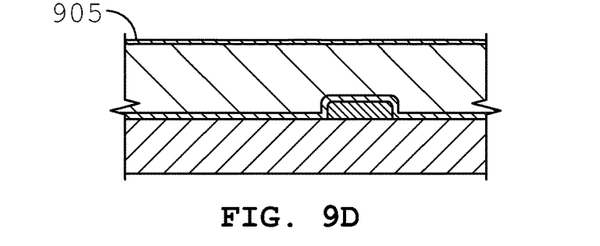

FIG. 9D illustrates the fourth step of the exemplary process. Second capping layer 905 can be formed over the structures below. Second capping layer 905, like first capping layer 904, can be optional, but can be useful in protecting subsequent process steps from material 920, because in some examples, material 920 can be porous and can trap substances that may be expelled during subsequent process steps. Second capping layer 905 can be any material that can be used for such a purpose, such as SiN.

Figure 9E:
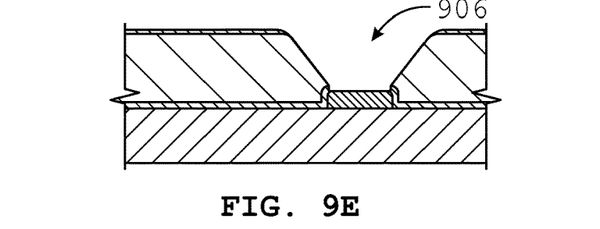

FIG. 9E illustrates the fifth step of the exemplary process. Second capping layer 905, material 920 and first capping layer 904 can be opened up to form via 906 to allow for electrical contact to be made to sense connection 902. Via 906 can be formed using any suitable process, such as a photolithography step followed by an etch step (e.g., dry etching), for example.

Figure 9F:
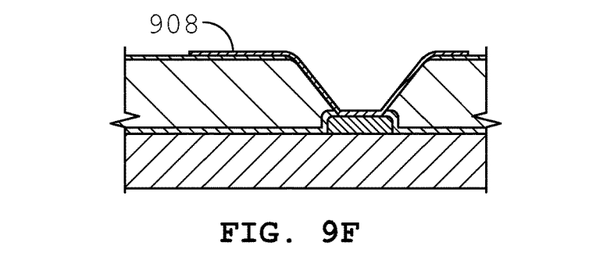

FIG. 9F illustrates the sixth step of the exemplary process. Intermediate conductive material 908 can be formed inside via 906 and over material 920 and second capping layer 905, if used. Intermediate conductive material 908 can be formed using any suitable material and method for forming a patterned electrically conductive material over the structures below.

Thus, the examples of the disclosure provide one or more configurations for electrically connecting touch pixel electrodes to sense circuitry in a touch screen while minimizing effects on the operation of the touch screen, including the aperture ratio of the touch screen.

Therefore, according to the above, some examples of the disclosure are directed to a touch screen having layers, the touch screen comprising a substrate upon which the layers of the touch screen are disposed; a touch region including a touch pixel electrode, a first display sub-pixel and a second display sub-pixel; a sense connection coupled to touch sensing circuitry, the sense connection disposed between the touch pixel electrode and the substrate; and an intermediate connection disposed between the touch pixel electrode and the sense connection, the intermediate connection being electrically coupled to: the sense connection at the first display sub-pixel, and the touch pixel electrode at the second display sub-pixel. Additionally or alternatively to one or more of the examples disclosed above, in some examples, the intermediate connection is coupled to the sense connection at the first display sub-pixel by a first via, and the intermediate connection is coupled to the touch pixel electrode at the second display sub-pixel by a second via. Additionally or alternatively to one or more of the examples disclosed above, in some examples, the first via and the second via reside in different layers of the touch screen. Additionally or alternatively to one or more of the examples disclosed above, in some examples, the touch screen further comprises a first structure; and a third display sub-pixel in the touch region, wherein the first display sub-pixel includes the first structure, the third display sub-pixel includes the first structure, and the sense connection is disposed between the first structure and the substrate, and underneath the first structure in the third display sub-pixel and partially underneath the first structure in the first display sub-pixel. Additionally or alternatively to one or more of the examples disclosed above, in some examples, the first structure comprises a data line. Additionally or alternatively to one or more of the examples disclosed above, in some examples, the first display sub-pixel includes a first structure of a first material type, the second display sub-pixel includes a second structure of the first material type, and the intermediate connection comprises the intermediate connection of the first material type. Additionally or alternatively to one or more of the examples disclosed above, in some examples, the first structure comprises a first gate line portion of a gate line material, the second structure comprises a second gate line portion of the gate line material, and the intermediate connection comprises the intermediate connection of the gate line material. Additionally or alternatively to one or more of the examples disclosed above, in some examples, the first display sub-pixel is disposed adjacent to the second display sub-pixel. Additionally or alternatively to one or more of the examples disclosed above, in some examples, the touch screen further comprises a third display sub-pixel in the touch region, the third display sub-pixel being disposed between the first display sub-pixel and the second display sub-pixel, wherein the intermediate connection passes through the third display sub-pixel. Additionally or alternatively to one or more of the examples disclosed above, in some examples, the first display sub-pixel comprises a first blue display sub-pixel, and the second display sub-pixel comprises a second blue display sub-pixel. Additionally or alternatively to one or more of the examples disclosed above, in some examples, the touch pixel electrode comprises a self-capacitance touch pixel electrode. Additionally or alternatively to one or more of the examples disclosed above, in some examples, the touch sensing circuitry comprises an operational amplifier, the sense connection is coupled to an inverting input of the operational amplifier, and a voltage source is coupled to a non-inverting input of the operational amplifier.

Some examples of the disclosure are directed to a method for fabricating a touch screen, the method comprising forming a sense connection on a substrate, the sense connection configured for coupling to touch sensing circuitry; forming an intermediate connection on the sense connection such that the sense connection is disposed between the intermediate connection and the substrate, the intermediate connection being configured to couple to the sense connection at a first display sub-pixel, and a touch pixel electrode at a second display sub-pixel, the intermediate connection being disposed between the touch pixel electrode and the sense connection, wherein the touch pixel electrode, the first display sub-pixel and the second display sub-pixel are included in a touch region in the touch screen. Additionally or alternatively to one or more of the examples disclosed above, in some examples, the method further comprises forming a first via at the first display sub-pixel for coupling the sense connection to the intermediate connection; and forming a second via at the second display sub-pixel for coupling the intermediate connection to the touch pixel electrode. Additionally or alternatively to one or more of the examples disclosed above, in some examples, the first via and second via are formed in different layers of the touch screen. Additionally or alternatively to one or more of the examples disclosed above, in some examples, the method further comprises forming a first structure in the first display sub-pixel and a third display sub-pixel in the touch region, wherein the sense connection is disposed between the first structure and the substrate, and underneath the first structure in the third display sub-pixel and partially underneath the first structure in the first display sub-pixel. Additionally or alternatively to one or more of the examples disclosed above, in some examples, forming the first structure comprises forming a data line. Additionally or alternatively to one or more of the examples disclosed above, in some examples, the method further comprises forming a first structure of a first material type in the first display sub-pixel, and a second structure of the first material type in the second display sub-pixel, wherein forming the intermediate connection comprises forming the intermediate connection of the first material type. Additionally or alternatively to one or more of the examples disclosed above, in some examples, forming the first structure comprises forming a first gate line portion of a gate line material, forming the second structure comprises forming a second gate line portion of the gate line material, and forming the intermediate connection comprises forming the intermediate connection of the gate line material. Additionally or alternatively to one or more of the examples disclosed above, in some examples, the first display sub-pixel is disposed adjacent to the second display sub-pixel. Additionally or alternatively to one or more of the examples disclosed above, in some examples, the touch region further includes a third display sub-pixel, the third display sub-pixel being disposed between the first display sub-pixel and the second display sub-pixel, wherein the intermediate connection is formed through the third display sub-pixel. Additionally or alternatively to one or more of the examples disclosed above, in some examples, the first display sub-pixel comprises a first blue display sub-pixel, and the second display sub-pixel comprises a second blue display sub-pixel. Additionally or alternatively to one or more of the examples disclosed above, in some examples, the method further comprises forming the touch pixel electrode, wherein the touch pixel electrode comprises a self-capacitance touch pixel electrode. Additionally or alternatively to one or more of the examples disclosed above, in some examples, the touch sensing circuitry comprises an operational amplifier, the sense connection is coupled to an inverting input of the operational amplifier, and a voltage source is coupled to a non-inverting input of the operational amplifier.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen having layers, the touch screen comprising:
   a substrate upon which the layers of the touch screen are disposed;
   a touch region including a touch pixel electrode, a first display sub-pixel and a second display sub-pixel;
   a sense connection coupled to touch sensing circuitry, the sense connection disposed between the touch pixel electrode and the substrate; and
   an intermediate connection disposed between the touch pixel electrode and the sense connection, the intermediate connection being electrically coupled to:
      the sense connection at the first display sub-pixel, and
      the touch pixel electrode at the second display sub-pixel.

2. The touch screen of claim 1, wherein:
   the intermediate connection is coupled to the sense connection at the first display sub-pixel by a first via, and
   the intermediate connection is coupled to the touch pixel electrode at the second display sub-pixel by a second via.

3. The touch screen of claim 2, wherein the first via and the second via reside in different layers of the touch screen.

4. The touch screen of claim 1, further comprising:
   a first structure; and
   a third display sub-pixel in the touch region, wherein:
      the first display sub-pixel includes the first structure,
      the third display sub-pixel includes the first structure, and
      the sense connection is disposed between the first structure and the substrate, and underneath the first structure in the third display sub-pixel and partially underneath the first structure in the first display sub-pixel.

5. The touch screen of claim 4, wherein the first structure comprises a data line.

6. The touch screen of claim 1, wherein:
the first display sub-pixel includes a first structure of a first material type,
the second display sub-pixel includes a second structure of the first material type, and
the intermediate connection comprises the intermediate connection of the first material type.

7. The touch screen of claim 6, wherein:
the first structure comprises a first gate line portion of a gate line material,
the second structure comprises a second gate line portion of the gate line material, and
the intermediate connection comprises the intermediate connection of the gate line material.

8. The touch screen of claim 1, wherein the first display sub-pixel is disposed adjacent to the second display sub-pixel.

9. The touch screen of claim 1, further comprising a third display sub-pixel in the touch region, the third display sub-pixel being disposed between the first display sub-pixel and the second display sub-pixel, wherein the intermediate connection passes through the third display sub-pixel.

10. The touch screen of claim 1, wherein:
the first display sub-pixel comprises a first blue display sub-pixel,
and the second display sub-pixel comprises a second blue display sub-pixel.

11. The touch screen of claim 1, wherein the touch pixel electrode comprises a self-capacitance touch pixel electrode.

12. The touch screen of claim 1, wherein:
the touch sensing circuitry comprises an operational amplifier,
the sense connection is coupled to an inverting input of the operational amplifier, and
a voltage source is coupled to a non-inverting input of the operational amplifier.

13. A method for fabricating a touch screen, the method comprising:
forming a sense connection on a substrate, the sense connection configured for coupling to touch sensing circuitry;
forming an intermediate connection on the sense connection such that the sense connection is disposed between the intermediate connection and the substrate, the intermediate connection being configured to couple to:
the sense connection at a first display sub-pixel, and
a touch pixel electrode at a second display sub-pixel, the intermediate connection being disposed between the touch pixel electrode and the sense connection,
wherein the touch pixel electrode, the first display sub-pixel and the second display sub-pixel are included in a touch region in the touch screen.

14. The method of claim 13, further comprising:
forming a first via at the first display sub-pixel for coupling the sense connection to the intermediate connection; and
forming a second via at the second display sub-pixel for coupling the intermediate connection to the touch pixel electrode.

15. The method of claim 14, wherein the first via and second via are formed in different layers of the touch screen.

16. The method of claim 13, further comprising:
forming a first structure in the first display sub-pixel and a third display sub-pixel in the touch region, wherein the sense connection is disposed between the first structure and the substrate, and underneath the first structure in the third display sub-pixel and partially underneath the first structure in the first display sub-pixel.

17. The method of claim 16, wherein forming the first structure comprises forming a data line.

18. The method of claim 13, further comprising:
forming a first structure of a first material type in the first display sub-pixel, and a second structure of the first material type in the second display sub-pixel, wherein forming the intermediate connection comprises forming the intermediate connection of the first material type.

19. The method of claim 18, wherein:
forming the first structure comprises forming a first gate line portion of a gate line material,
forming the second structure comprises forming a second gate line portion of the gate line material, and
forming the intermediate connection comprises forming the intermediate connection of the gate line material.

20. The method of claim 13, wherein the first display sub-pixel is disposed adjacent to the second display sub-pixel.

21. The method of claim 13, wherein the touch region further includes a third display sub-pixel, the third display sub-pixel being disposed between the first display sub-pixel and the second display sub-pixel, wherein the intermediate connection is formed through the third display sub-pixel.

22. The method of claim 13, wherein:
the first display sub-pixel comprises a first blue display sub-pixel, and
the second display sub-pixel comprises a second blue display sub-pixel.

23. The method of claim 13, further comprising forming the touch pixel electrode, wherein the touch pixel electrode comprises a self-capacitance touch pixel electrode.

24. The method of claim 13, wherein:
the touch sensing circuitry comprises an operational amplifier,
the sense connection is coupled to an inverting input of the operational amplifier, and
a voltage source is coupled to a non-inverting input of the operational amplifier.

* * * * *